United States Patent [19]

Mery

[11] Patent Number: 4,744,626
[45] Date of Patent: May 17, 1988

[54] CONNECTOR FOR OPTICAL FIBER AND RECEIVING OR EMITTING PHOTOELEMENT AND METHOD OF POSITIONING AN OPTICAL FIBER ENDFACE RELATIVE TO PHOTOEMITTER

[75] Inventor: Jean-Paul Mery, Paris, France

[73] Assignee: Societe Anonyme de Telecommunications, Paris, France

[21] Appl. No.: 717,681

[22] Filed: Mar. 29, 1985

[30] Foreign Application Priority Data

Mar. 29, 1984 [FR] France .................... 84 04915

[51] Int. Cl.⁴ .................................. G02B 6/36
[52] U.S. Cl. ........................... 350/96.20; 250/227
[58] Field of Search ............. 350/96.20, 96.21, 96.22; 357/17, 19, 30; 250/227, 551; 361/395, 399, 400, 412, 413; 372/6

[56] References Cited

U.S. PATENT DOCUMENTS

| | | | |
|---|---|---|---|
| 3,097,032 | 7/1963 | Hochheiser | 361/412 |
| 3,278,714 | 10/1966 | Bernutz | 361/413 |
| 3,652,899 | 3/1972 | Henschen | 361/412 |
| 4,107,760 | 8/1978 | Zimmer | 361/412 |
| 4,119,363 | 10/1978 | Camlibel et al. | 350/96.20 |
| 4,170,399 | 10/1979 | Hansen et al. | 350/96.20 |
| 4,184,741 | 1/1980 | Hawk et al. | 350/96.20 |
| 4,268,756 | 5/1981 | Crouse et al. | 250/551 |
| 4,346,294 | 8/1982 | Albaugh et al. | 250/227 |
| 4,394,061 | 7/1983 | Schroeder | 350/96.20 |
| 4,399,541 | 8/1983 | Kovats et al. | 372/6 |
| 4,615,031 | 9/1986 | Eales et al. | 350/96.20 |

OTHER PUBLICATIONS

Balliet et al., IBM Tech. Discl. Bull., 25(8), Jan. 1983, "Coined Precision Mount for Fiber-Optic Driver/Receiver Surface Diodes", pp. 4261-4262.

Primary Examiner—William L. Sikes
Assistant Examiner—Frank González
Attorney, Agent, or Firm—Lowe, Price, LeBlanc, Becker & Shur

[57] ABSTRACT

A fiber optic connector comprises a planar holder, such as a printed circuit board, on which a photoelement is secured along a reference axis coaxial with an end of an optical fiber in a transmission system. The holder is secured by mechanical fasteners above a base member. A male member through which the fiber end runs is removably coupled mechanically to a female member integral with the base member such that an endface of the fiber end is opposite an end face of the photoelement along the reference axis. The holder carrying a photoelement, such as a photoreceiver, is positioned with respect to the female member coupled to the male member including the fiber end with the help of a micromanipulator and a dynamic adjustment responsive to an electrical signal derived from the photoreceiver receiving an optical signal transmitted by the fiber end. When the photoelement is a photoemitter, the dynamic adjustment consists responds to an optical signal resulting from an electrical signal converted by the photoemitter and transmitted to the fiber.

24 Claims, 5 Drawing Sheets

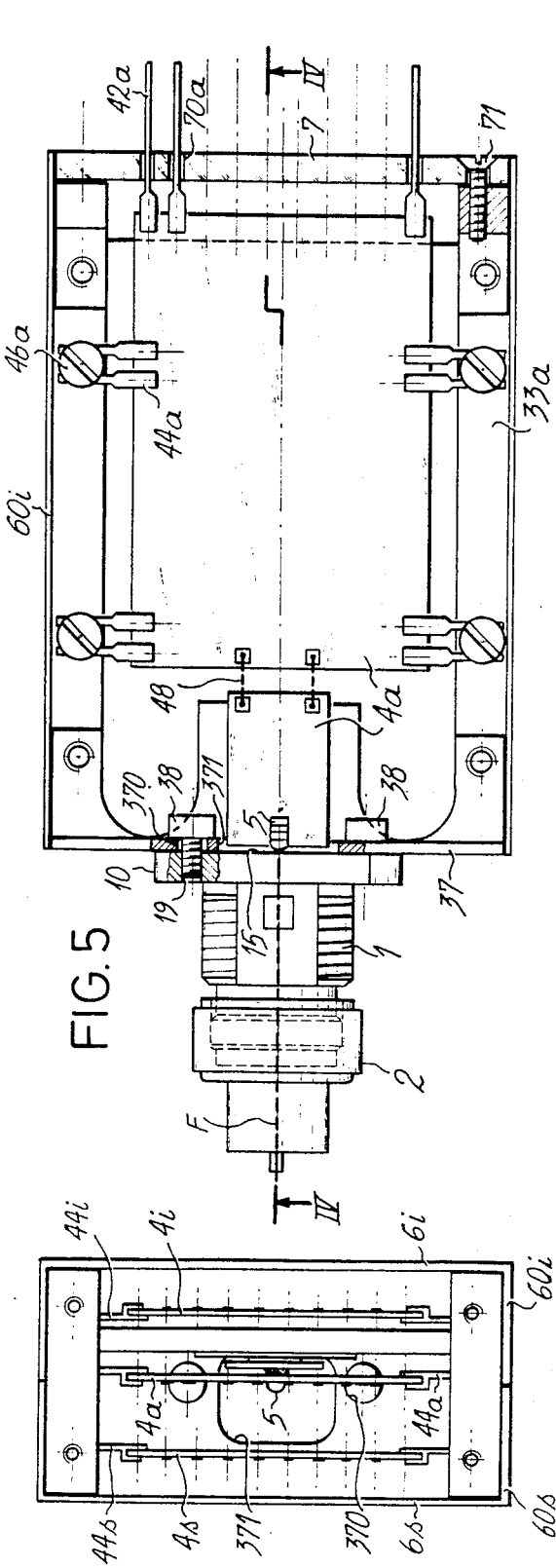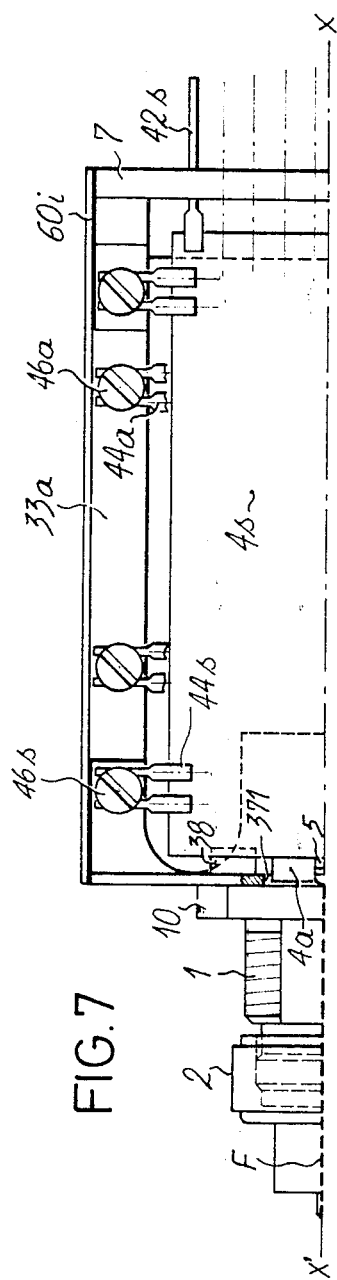
FIG.5
FIG.7
FIG.9

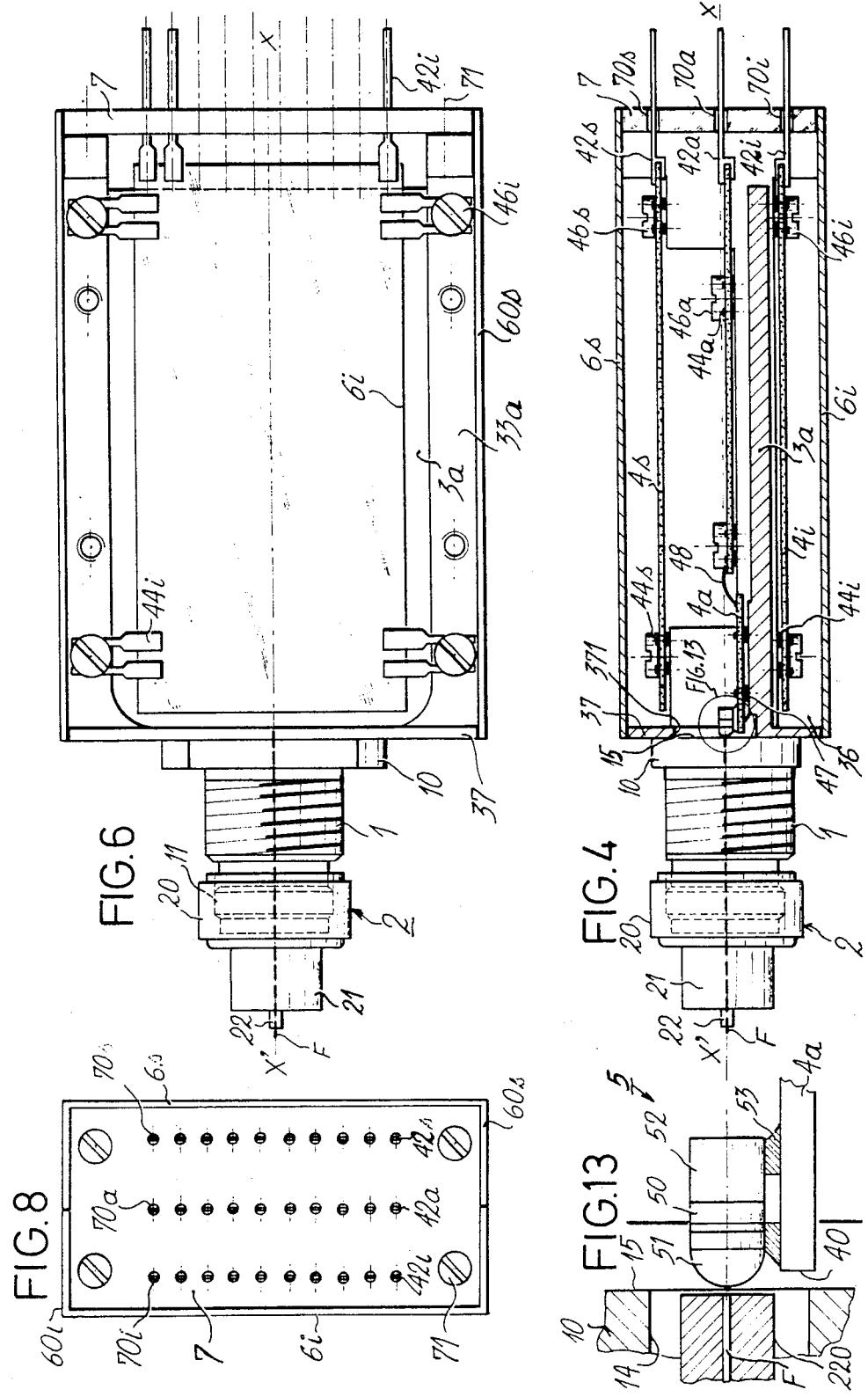

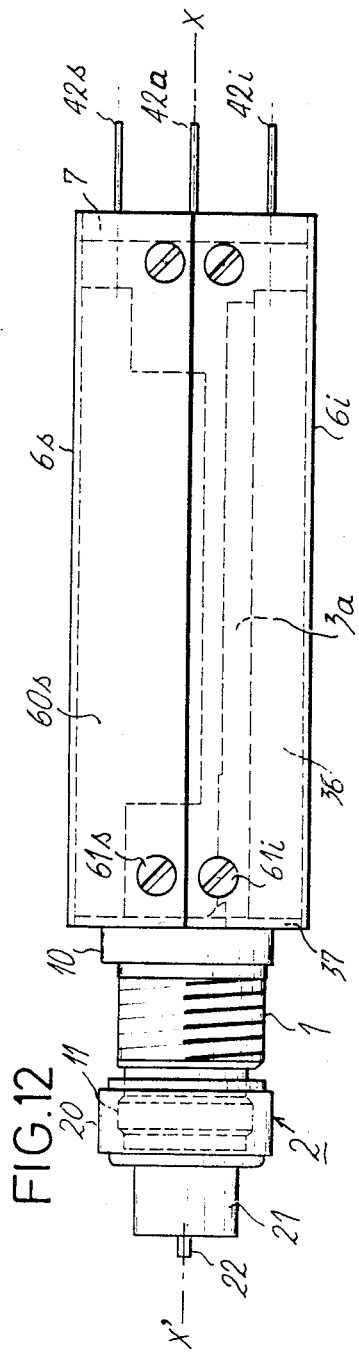
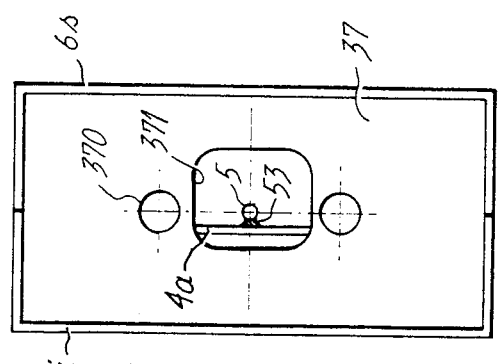
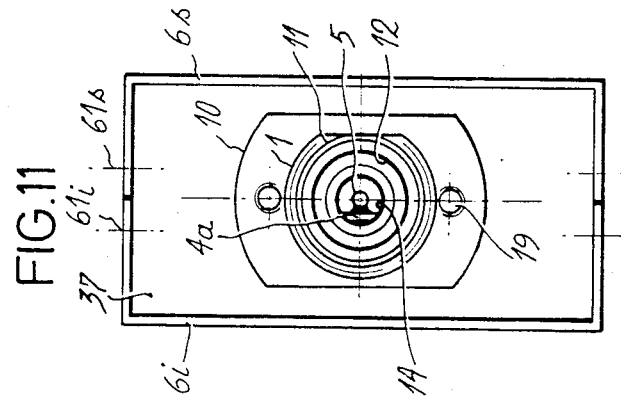

CONNECTOR FOR OPTICAL FIBER AND RECEIVING OR EMITTING PHOTOELEMENT AND METHOD OF POSITIONING AN OPTICAL FIBER ENDFACE RELATIVE TO PHOTOEMITTER

BACKGROUND OF THE INVENTION

1. Field of the Invention

The present invention relates to a connector for an optical fiber and a receiving or transmitting photoelement. The connector includes a planar holder on which the photoelement is secured along a reference axis coaxial with an end of the optical fiber. Such a connector is intended in particular for forming an optoelectronic interface at a receiving or transmitting end of an optical fiber in an optical fiber transmission system.

2. Description of the Prior Art

At a receiving end of an optical fiber transmission system, a photoelement is located in a photoreceiver housing as a semi-conductive chip photodiode enclosed in a small air-tight casing secured to a holder in order to protect the photodiode from the air. The air-tight casing carries two air-tight through-sections in which electrical connections run to form photoreceiver terminals. An intermediate short optical fiber for coupling purposes with a fiber of the transmission system runs through the sections. The accuracy required in positioning an endface of a first end of the coupling fiber with respect to a photosensitive face on the photodiode is on the order of a micron; this is achieved inside the air-tight casing when manufactured. A second end of the coupling fiber is connected to an end of the transmission fiber in the transmission system by means of a known connector for two optical fibers or by fiber-to-fiber welding.

Such a connector has essentially two drawbacks:

the connection of the intermediate coupling fiber between the photodiode and the transmission fiber to be connected requires an air-tight conduit through a wall of the casing that is very tricky to produce, and the coupling of the fiber in the transmission system with the photodiode requires a coupling optical fiber and hence at least one optical fiber connector thereby increasing the insertion losses in the transmission system and the cost of connecting line transmission fiber to the photoreceiver.

OBJECTS OF THE INVENTION

With this state of the art in mind, a main object of the invention is to obviate the above-described drawbacks.

Another object of the invention is to couple an optical fiber of a transmission system directly to a photoelement, such as a photoreceiver or a photoemitter, while maintaining the possibility of easily changing the optical fiber without modifying the relative location of the photoelement and the fiber for optimal coupling.

Another object of the invention is to provide a connector in which fiber/photoelement coupling is reliable time-wise and relatively immune to mechanically or thermally caused disturbances.

Yet another object of this invention is to provide a method for positioning a photoreceiver or a photoemitter with respect to a fiber endface in manufacturing fiber optic connectors.

A further object of this invention is to provide a method for positioning a fiber endface with respect to a photoreceiver or a photoemitter in manufacturing fiber optic connectors.

A further object of this invention is to provide a method for positioning a fiber endface with respect to a photoreceiver or a photoemitter in manufacturing fiber optic connectors.

SUMMARY OF THE INVENTION

These objects are accomplished in accordance with the present invention by providing in one embodiment a fiber optic connector comprising a planar holder onto which a photoelement is secured along a reference axis coaxial with an end of an optical fiber in a transmission system, a base member having a major surface to which the holder is secured, a female member coaxial with the reference axis, in front of the photoelement and integral with the base member, and a male member through which an end of the optical fiber runs. The male member is removably coupled mechanically to the female member such that an endface of the fiber end is opposite an end face of the photoelement along the reference axis.

The coupling between the female and male members preferably forms half of a known quick engaging coupler for two optical fiber ends. The male member thus forms an optical interface easy to take apart and reassemble hence permitting optical fiber interchaneability. The endface of the fiber always lies in a predetermined position along the reference axis, obtained for instance by squaring off the fiber end coplanarly with a reference face of the male element. When the male and female members are recoupled the reference face of the male element does not modify the relative positions of the fiber endface and the face of the photoelement, such as a photosensitive face of a photoreceiver or a photoradiating face in a photoemitter.

A further feature of the invention is that the photoelement is an air-tight casing including a hollow tubular body having a surface sealed by an air-tight and transparent window, such as a focusing lens, opposite the endface of the opticalfiber, and another face carrying a photoreceiving or photoemitting member. The photoelement is soldered to the holder by two solder spots forming two terminals of the photoreceiving or photoemitting member. No fiber runs into the air-tight casing thereby avoiding the sealing problems mentioned earlier in connection with the fiber.

In accordance with another aspect of the invention, the holder carrying the photoelement and other holders parallel therewith secured to the base member are printed and/or multi-layer circuit boards carrying discrete and/or integrated electronic components intended for processing, especially amplifying and correcting, an electrical signal recovered by the photoreceiver or fed to the photoemitter. The holders are preferably enclosed inside a cap secured to the base member to form a compact housing. These arrangements together reduce manufacturing costs and the size of electronic equipment and the lengths of the electrical connections between the electrical signal processing means and the photoreceiver or the photoemitter. The compact connector of the invention has a removable side accommodating the male member containing the end of the optical fiber, and another side formed of electrical connecting pins protruding from the holder or holders. The pins are typically plugged into a known connecting bar feeding other means for processing and transmitting the electrical signal.

The photoelement and the end of the optical fiber in the connector embodying the invention are positioned in one of two ways for finally fixing the photoelement in the connector. If the photoelement is a photoreceiver, it receives maximum power from an optical signal emitted by the endface of the optical fiber. Alternatively, if the photoelement is a photoemitter, it transmits maximum power towards the endface of the optical fiber in response to an electrical signal being fed to the photoelement terminals.

More particularly, a method for positioning a photoreceiver with respect to the endface of the optical fiber and includes the following steps:

(a) the female member is disposed coaxially with the reference axis and secured to the base member parallel to and below the reference axis, (b) the male member coaxially housing the optical fiber end is coupled to the female member to align the fiber end with the reference axis, (c) the holder bearing the photoreceiver is visually positioned over the base member by a micromanipulator such that the photoreceiver is substantially coaxial with the reference axis and within a few hundredths of a millimeter of the fiber endface, (d) an optical signal is injected into the optical fiber and converted by the photoreceiver into an electrical signal, and the holder is moved in three-dimensional space by the micromanipulator until the electrical signal reaches maximum power corresponding to optimal positioning of the photoreceiver and the holder, and (e) the holder in the optimal position is secured to the base member.

If the photoelement is a photoemitter, a method for positioning the photoemitter with respect to the endface of the optical fiber end consists of replacing step (d) in the above method by feeding an electrical signal to terminals of the photoemitter which converts it to an optical signal transmitted through the optical fiber, and moving the holder in three-dimensional space by the micromanipulator until the optical signal leaving the fiber reaches maximum power thus corresponding to optimal positioning of the photoemitter and the holder.

Reciprocally, a method for positioning the endface of the optical fiber with respect to the photoreceiver consists of the following steps:

(a) the holder bearing the photoreceiver is visually positioned over the base member by a micromanipulator such that the photoreceiver is substantially coaxial with the reference axis and a front face of the photoreceiver abuts against a gauge transverse to the reference axis, (b) the holder is secured to the base member, and the gauge is removed, (c) the female member is coupled to the male member coaxially housing the optical fiber end, (d) a face of the female member is brought up to a face of the base member orthogonally with the reference axis by the micromanipulator such that the fiber endface lies within a few hundredths of a millimeter of the front face of the photoreceiver.

(e) an optical signal is injected into the optical fiber and converted by the photoreceiver into an electrical signal, and the female member is moved orthogonally to the reference axis until the electrical signal reaches maximum power corresponding to optimal positioning of the female member and the fiber endface, and (f) the face of the female member in the optimal position is secured to the face of the base member.

When the photoelement is a photoemitter, the endface of the optical fiber end is positioned with respect to the photoemitter by replacing step (e) in the above method by feeding an electrical signal to terminals of the photoemitter which converts it to an optical signal that is transmitted through the optical fiber, and the female member is moved orthogonally to the reference axis until the optical signal leaving the fiber reaches maximum power corresponding to optimal positioning of the female member and the fiber endface.

BRIEF DESCRIPTION OF THE DRAWINGS

The foregoing and other objects, features and advantages of the invention will be apparent from the following detailed description of several preferred embodiments of the invention with reference to the corresponding accompanying drawings in which:

FIG. 4 is a longitudinal cross-sectional view taken along the broken line IV—IV in FIG. 5 of a connector including three parallel printed boards and two half-housings, according to a second embodiment;

FIGS. 5, 6 and 7 are respectively a plan view of a board carrying a photoreceiver, an underside view of a lower board and a half plan view of an upper board in the connector according to the second embodiment;

FIGS. 8 and 9 are rear views of the connector according to the second embodiment, respectively with and without a rear insulating plate through which electrical connection pins run;

FIGS. 10 and 11 are front views of the connector respectively without and with a female member, according to the second embodiment;

FIG. 12 is a longitudinal side view of the connector according to the second embodiment; and FIG. 13 is a longitudinal cross-sectional view of a clean-up of the photoreceiver in the connector according to the second embodiment.

DESCRIPTION OF THE PREFERRED EMBODIMENT

The embodiments described herein relate to a connector for an optical fiber and a photoreceiver.

Figure 1:
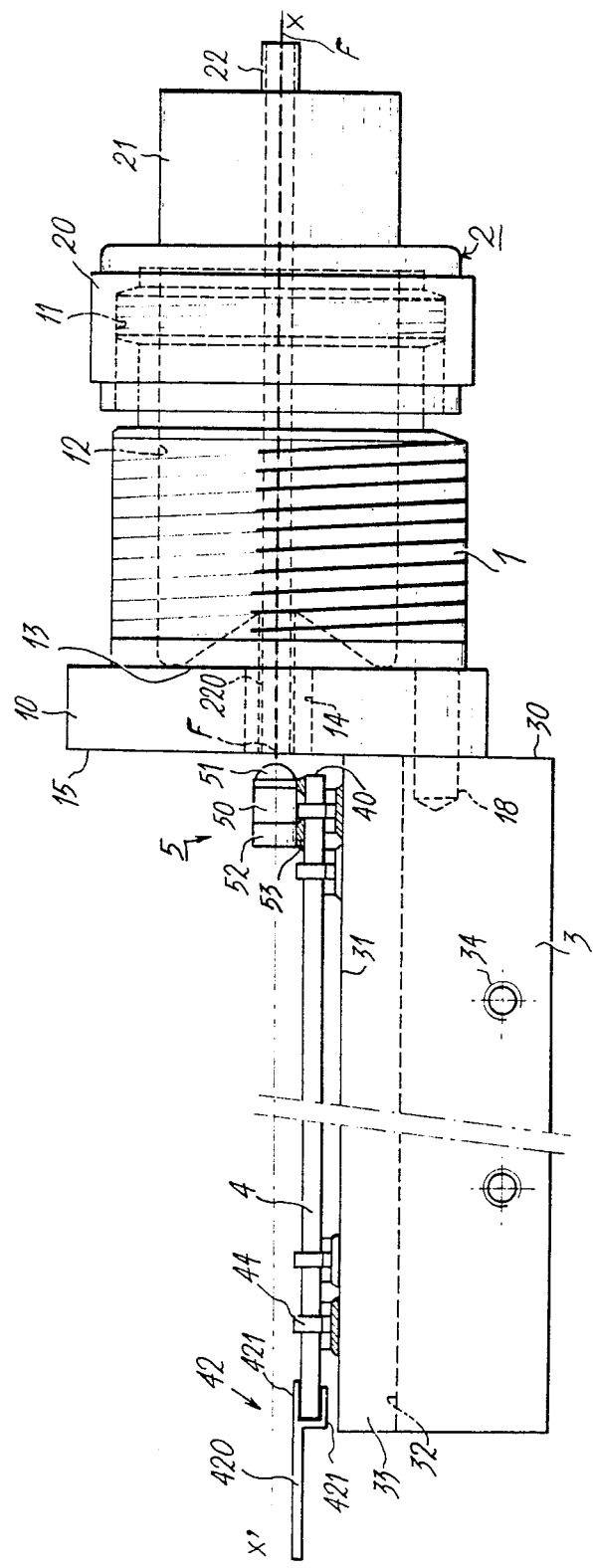
FIG. 1 is a longitudinal side view of a connector with no cover, according to a first embodiment.
Figure 2:
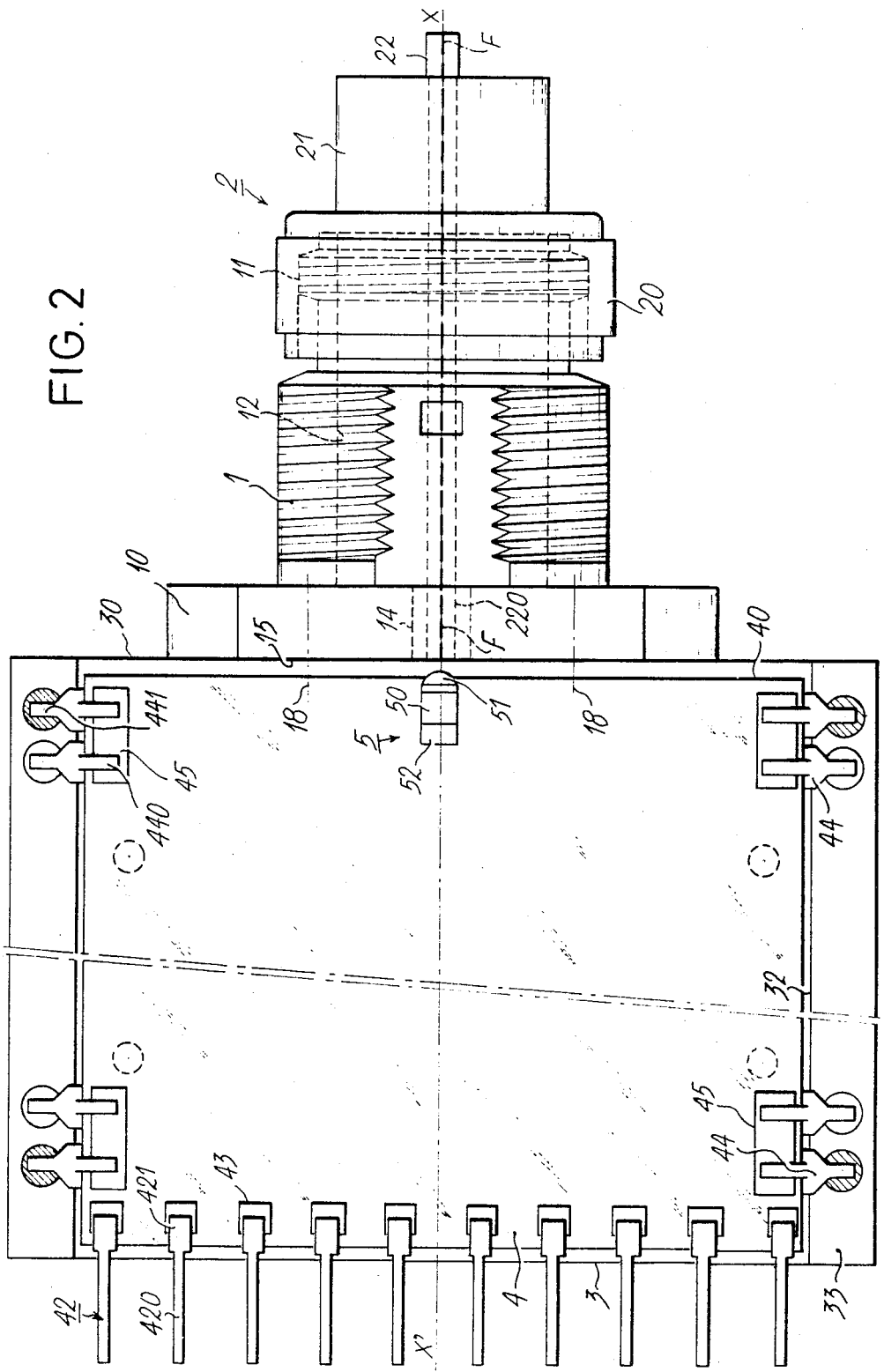
FIG. 2 is a plan view of the connector with no cover, according to the first embodiment.
Figure 3:
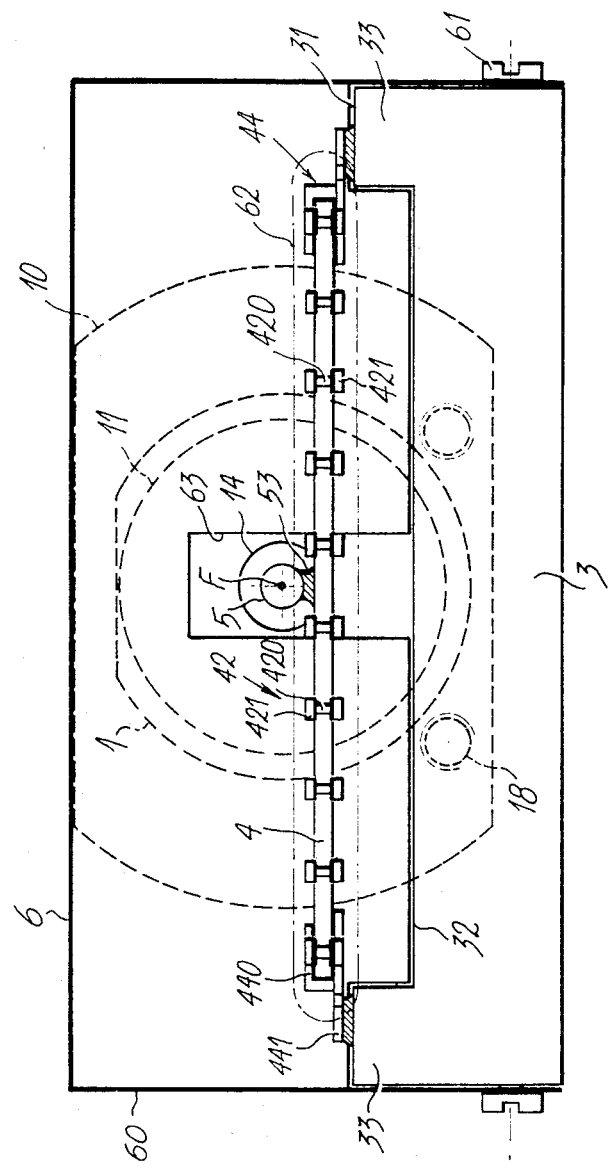
FIG. 3 is a rear view of the connector with the cover and rear wall of the cover omitted, according to the first embodiment.

As shown in FIGS. 1 to 3, a connector embodying the invention comprises at the front part, half of a known quick engaging coupler for the ends of two optical fibers, made up of cylindrical female member or plug 1 and a cylindrical male member or socket 2, and at the rear part, a base member 3 having an overall parallelepiped shape accommodating an insulating planar holder such as a small rectangular printed circuit board 4. Board 4 bears a photoreceiver 5 rearward of the female member 1.

The female member 1 has an overall cylindrical form that is coaxial with a reference axis X'X defining the longitudinal direction in which the photoreceiver 5 is aligned with an optical fiber F held axially in the male member 2. The female member 1 carries a rear flange 10 to which a front transverse edge 30 of the base member 3 is soldered and/or secured by screws and tapped holes 18 such that a major surface referred to as top face 31 of said base member is precisely parallel with the axis X'X and below said axis X'X as depicted in FIG. 1. At the front part, member 1 has a threaded section 11 onto which a central knurled nut 20 of the male member 2 is screwed. The nut 20 is freely rotated between two shoulders of a hollow cylinder 21 of the member 2. A small hollow shaft 22 running through the cylinder 21 is coaxially soldered inside the cylinder 21. In a further embodiment, the shaft 22 is slidably mounted between two retainers in the cylinder 21 and is thrust rearward by a spring. One end of the optical fiber F is slipped into the shaft 22 and held therein by bonding. An endface of fiber F is squared off in line with a rear end 220 of the shaft 22 protruding from the cylinder 21. The quick engaging coupler is obtained by fully engaging a front portion of the cylinder 21 in a straight bore 12 having a rear 13 in member 1 and by fully tightening the knurled nut 20 around the threaded section 11. The rear end 220 of the shaft 22 freely enters a small hole 14 in the flange 10 until the endface of the fiber F becomes substantially coplanar with the rear face 15 of flange 10 until the endface of the fiber F becomes substantially coplanar with the rear face 15 of flange 10 soldered and/or screwed at the lower portion to the base member 3. Fiber F is thus firmly held coaxially with axis X'X.

A major top face of the board 4 carries the photoreceiver 5 in proximity to edge 40 in front of the rear face 15 of the flange 10, together with discrete and/or integrated electronic components not shown, forming a hybrid circuit. The roles of the hybrid circuit are primarily to bias photoreceivers and to preamplify an electrical signal obtained by opto-electrical conversion of an optical signal supplied by optical fiber F to the photoreceiver. The photoreceiver 5 takes the form of a small air-tight casing comprising a hollow tubular body such as generally cilincrical sleeve 50. A front shoulder of sleeve 50 is sealed by a transparent, planar and discoidal glass window or a biconvex focusing lens 51 bearing a flat step. A small base member is soldered to the rear of the sleeve 50; the front face inside the sleeve carries a photoreceiving element 52, such as an avalanche diode, coaxial with the optical axis of lens 51. The distance from the photosensitive surface of the photoreceiver 52 to thecenter of the window or lens 51 as well as the optical and geometrical characteristics are arranged such that the photoreceiver will receive maximum optical power from a light signal leaving one end of an optical fiber, e.g. fiber F, located within a few hundredths of a millimeter in front of the lens 51. As depicted in FIGS. 2 and 3, the photoreceiver 5 casing is rigidly fixed over a longitudinal axis of the board by two spot welds 53 in line with the rear base member carrying the photoreceiving element and the front shoulder of sleeve 50. The spot welds 53 form two terminals for the photoreceiving element.

Board 4 is visually positioned over a wide longitudinal groove 32 running in the top face of base member 3 such that the photoreceiver 5 is substantially coaxial with the axis X'X and the lens 51 lies within a few hundredths of a millimeter of the endface of optical fiber F. Visual positioning is carried out by using a micromanipulator gripping the rear of board 4 above the groove 32 and providing board movement in three-dimensional space. Base member 3 is fixed to a reference table on the micromanipulator.

A dynamic adjustment perfects the positioning of photoreceiver 5 by injecting an optical signal into another end of fiber F and moving the board 4 with the aid of the micromanipulator to obtain an electrical signal having maximum amplitude at the output of the hybrid preamplifying circuit. The board 4 is electrically connected to a measurement apparatus and subsequently to the rest of the electrical signal processing means by flat pins 42. Each pin has a tip 420 jutting outward from the rear edge of the board 4 and a pair of superimposed flats 421 pinching two-sided metal-plated strips 43 on the board. The upper flats 421 of pins 42 are soldered to the board. The position corresponding to the received maximum amplitude is then maintained by rigidly securing board 4 to base member 3, by fasteners such as small prongs 44. As shown in FIGS. 2 and 3, two pairs of prongs 44 are provided at the four corners of the board 4 and on longitudinal edges 33 of base member 3. Each prong 44 carries two superimposed flat arms 440 and a flat tail 441. Both arms 440 pinch a two-sided metal-plated strip 45 on the board 4, wherein the upper and lower arms are soldered to the board. Next, the tails 441 of the prongs are preferably bonded to the correspoonding edges 33 of the groove 32 so that, if necessary, the board may be adjusted while a bonding agent is setting. Connections between the tails 441 and the edges 33 are then consolidated by soldering. The board 4 is thus secured permanently above the groove 32 in the base member and beneath the axis X'X with optimal positioning of the photoreceiver 5.

Base member 3, rigidly carrying board 4, is covered with a parallelepiped metal cap 6 (FIG. 3) having longitudinal side walls 60 fixed by screws 61 in transverse threaded holes 34 in the base member. Tips 420 of electrical connecting pins 42 fit through a transverse slot 62 in the rear wall of cap 6, shown by a dot and dash line in FIG. 3. A front wall of the cap 6 contacts face 15 of the flange 10 and carries a central cut-out 63 above a chink between the lens 51 and the endface of fiber F. A lower edge on the front wall of the cap is profiled like the front side 30 of the base member.

The fiber F that serves in positioning the photoreceiver 5 and the board 4 is then withdrawn from the male member 2 of the connector to be replaced by the tip of an optical fiber from an optical fiber transmission system. By way of an example, the newly inserted optical fiber is part of an optical fiber cable feeding a terminal equipment, such as an optical head junction for a distribution frame in a telephone exchange. The connector embodying the invention thus forms a compact opto-electronic interface with an input including the female member 1 to which a male member 2 containing the end of an optical fiber is removably mated, and an output consisting of the row of tips 420 on pins 42 that are plugged into a removable electrical terminal bar that delivers the electrical signal recovered by photoreceiver 5.

In a modified embodiment, the hybrid biasing and preamplifying circuit is made up of micropackages or base chips of electronic components disposed on the board 3 and is covered by a small metal cap sealed directly to the major upper face of the board. The photodetector 5 is located outside the small cap and is connected to the hybrid circuit through serigraphical conductive layers in the multi-layer type board 3 over which the small cap is hermetically sealed. All or part of the hybrid circuit can be replaced by an integrated circuit satisfying biasing, preamplifying, automatic gain control and power amplifying operations and other correcting operations normally accomplished at the output of a conventional optical signal receiving circuit.

In a second embodiment depicted in FIGS. 4 and 13, a base member 3a of a connector embodying the invention carries several superimposed parallel printed circuit boards, e.g. three boards, 4a, 4i and 4s. As shown in FIG. 4, lower board 4i is lodged in a cavity 36 subjacent base member 3a, and upper board 4s is lodged over intermediate board 4a carrying the photoreceiver 5. Corners on each of the boards 4a, 4i and 4s are secured to longitudinal edges 33a of the base member 3a by prongs 44a, 44i and 44s, analogous to prongs 44, having a first group of tips pinching the longitudinal edges of the boards and soldered to metal-plated strips thereon and a second group of tips attached to the longitudinal edges of the base member by screws 46a, 46i and 46s respectively. The boards 4a, 4i and 4s can be printed and/or multilayer circuit boards carrying discrete and/or integrated electronic components suitable for processing the electrical signal recovered by the photoreceiver 5. In the second embodiment, the central board 4a is a small printed board disposed in front of base member 3a. Board 4a carries the photoreceiver 5 and is bonded by soldered tabs and ribs 47 to the base member. Board 4a includes a bigger printed board that carries electronic components and is connected by two straps 48 to the photoreceiver terminals 53. The rear edges of boards 4a, 4i and 4s respectively carry electrical connecting pins 42a, 42i and 42s (analogous to pins 42) forming three superimposed transverse rows and fitting through holes 70a, 70i and 70s in a rear flange, such as an electrical isolating plate 7, secured by screws 71 against rear uprights of base member 3a, as shown in FIGS. 5 and 8.

In the second embodiment, base member 3a comprises a rectangular front side 73 that is orthogonal with reference axis X'X and identical in dimension to the isolating plate 7. The face 15 of the female member flange 10 is secured against the side 37 by two longitudinal screws 38 parallel to the axis X'X, as shown in FIG. 5. The screws 38 are inserted from the top of the base member 3a in proximity to board 4a, slip freely through smooth holes 370 running through the side 37 and are screwed into tapped holes 19 in the flange 10. The diameter of the smooth through holes 370 is greater than that of the holes 19 and the screws 38 to position optical fiber F with respect to photoreceiver 5 as described below, and not to position photoreceiver 5 with respect to fiber F as in the first embodiment.

The board 4a is positioned visually using the micromanipulator such that the photoreceiver 5 is approximately coaxial with the axis X'X and such that the front face 51 of photoreceiver 5, including a focusing lens or a window, abuts against a transverse gauge applied against the front side 37 of the base member 3a and partially entering a wide aperture 371 therein. The thickness of the gauge is established in terms of the distance between the fiber endface and the photoreceiver face 51. With face 51 abutting against the gauge, the board 4a is secured to the base member by mechanical fasteners 44a-46a, or as in the embodiment shown, the small front printed board carrying the photoreceiver is bonded and/or soldered to the base member 3a by transverse ribs 47. The gauge is removed. The female member 1 is coupled to the male member 2 provided with the optical fiber F and is then gripped with the micromanipulator in order that the flange 10 is pressed against the front side 37 of the base member 3a and that the endface of optical fiber F is situated within a few hundredths of a millimeter of the front face 51 of photoreceiver 5. The position of female member 1 is then perfected in two transverse directions orthogonal to the axis X'X by dynamic adjustment, as in the first embodiment. When the measured output level of the electrical signal derived by photoreceiver 5 reaches a maximum value, the female member 1 and the fiber F endface are maintained in this optimal position by two screws 38 freely inserted in the wide smooth holes 370 in the front side 37 of the base member. Screws 38 are screwed into the tapped holes 19 in flange 10 so they press flange 10 against base member front side 37. This optimal position can be further consolidated by soldering flange 10 and side 37.

In a modified embodiment, the smooth holes 370 are replaced by tapped holes with a smaller diameter; the tapped holes 19 are replaced by smooth holes with a greater diameter and the screws 38 are inserted from the outside, from the front surface of the flange 10.

The base member 3a is then covered with a metal housing including a lower half-housing 6i and an upper half-housing 6s, as shown in FIG. 12. Longitudinal side walls 60i and 60s of the respective halfhousings 6i and 6s are secured to the base member 3a by screws 61i and 61s. Side walls 60i and 60s longitudinally intersect on a line aligned with the board 4a. Lateral U-shaped end edges of the halfhousings 6i and 6s are pressed against the rectangular peripheries of front side 37 of base member 3a and rear insulating plate 7, as shown in FIGS. 8, 10 and 11.

As stated above, the various embodiments described herein can be used to form a connector for an optical fiber and a photoemitter. The photoreceiver 52 is replaced by a photoemitter such as a laser diode or a light emitting diode LED included in a small casing having dimensions analogous to those of the casing 50-51-51. The hybrid circuit is, in this instance, intended primarily for biasing the photoemitter and for amplifying an electrical signal converted into an optical signal transmitted to the optical fiber. As far as the relative location of the photoemitter with respect to the endface of the fiber is concerned, the dynamic adjustment involves feeding an electrical signal to terminals 53 of the photoemitter and obtaining maximum optical power after travelling through the optical fiber.

What I claim is:

1. A connector for an optical fiber and a photoelement, said connector comprising a planar holder, said photoelement being secured to said holder along a reference axis coaxial with an end of said optical fiber, a base member having a major surface on which said holder is secured, a female member positioned coaxially with the reference axis so it is in front of said photoelement and integral with said base member, and a male member in which said end of said optical fiber is slightly bonded, said fiber having an endface squared off in line with a reference face of said male member facing said photoelement, said end fiber endface being spaced by a predetermined distance from an endface of said photoelement, said male member being removably, mechanically coupled to said female member such that said endface of said fiber end is opposite said endface of said photoelement along said reference axis, said photoelement comprising a hollow tubular body having a face sealed by an air-tight and transparent window opposite said endface of said optical fiber, and another face carrying a small photomember.

2. The connector claimed in claim 1 wherein said female member and said male member form half of a quick engaging coupler for ends of optical fibers.

3. The connector claimed in claim 1 wherein said hollow body is soldered to said holder by two solder spots forming two terminals of said photomember.

4. The connector claimed in claim 1 wherein said transparent window is a focussing lens and said photomember is a photoreceiver.

5. The connector claimed in claim 1 wherein said transparent window is a focussing lens and said photomember is a photoemitter.

6. The connector claimed in claim 1 wherein two edges of said holder disposed parallel to said reference axis are secured to parallel edges on said base member.

7. A connector as claimed in claim 6 comprising plural mechanical fasteners each having two end arms pinching one of said edges of said holder, and an end tail secured to one of said edges of said base member.

8. A connector as claimed in claim 1 comprising electrical connecting pins secured to an edge of said holder opposite said photoelement and said female member, each of said pins including two superimposed flats pinching at least a metal strip on said holder, and a tip jutting outward from said holder edge.

9. A connector as claimed in claim 8 comprising electronic components connected to said pins and carried on said holder, and a cap fixed to said holder covering said electronic components and said photoelement, said pin tops fitting freely through a slot of said cap.

10. A connector as claimd in claim 1 comprising plural parallel holders for printed circuit boards carrying electronic components and mechanical fasteners including electrical connecting pins for securing said holders to said base member.

11. A connector as claimed in claim 10 comprising a cap covering at least a major face of said base member from the top-side, said holder carrying said photoelement, said cap being secured to said base member and joining a face of said female member facing said photoelement.

12. A connector as claimed in claim 11 comprising a second cap covering at least another major surface of said base member from the underside and one of said parallel holders, said second cap being secured to said base member and joining said face of said female member facing said photoelement.

13. The connector as claimed in claim 12 wherein end tips of said pins fit freely through at least a slot in said cap.

14. A connector as claimed in claim 12 wherein said pins fit through an electrically insulating plate fixed to said base member.

15. The connector claimed in claim 1 wherein said base member is secured to a face of said female member orthogonal to said reference axis and substantially coplanar with said fiber endface.

16. The connector claimed in claim 10 wherein said photoelement includes a photoreceiver.

17. The connector claimed in claim 10 wherein said photoelement includes a photoemitter.

18. A method for positioning a photoreceiver with respect to an endface of an optical fiber end wherein
a female member is disposed coaxially with a reference axis, and secured to a base member parallel to and below said reference axis,
a male member coaxially houses said optical fiber end and is coupled to said female member to align said fiber end with said reference axis,
a holder bearing said photoreceiver the method comprising the steps of
(a) visually positioning a holder bearing said photoreceiver over said base member with a micromanipulator such that said photoreceiver is substantially coaxial with said reference axis and within a few hundredths of a millimeter of said fiber endface,
(b) injecting optical energy into said optical fiber, said optical energy being converted by said photoreceiver into an electrical signal, moving said holder in three-dimensional space with said micromanipulator until said electrical signal reaches a maximum level corresponding to optimal positioning of said photoreceiver and said holder, and
(c) securing said holder in the optimal position to said base member.

19. A method for positioning an endface of an optical fiber and with respect to a photoreceiver comprising
(a) visually positioning a holder bearing said photoreceiver over a base member with a micromanipulator such that said photoreceiver is substantially coaxial with a reference axis and a front face of said photoreceiver abuts against a gauge transverse to said reference axis,
(b) securing said holder to said base member while said guage is removed from the reference axis,
(c) coupling said female member to a male member in which said optical fiber end is coaxially housed,
(d) moving a face of said female member up to a face of said base member so it is orthogonal with said reference axis with said micromanipulator such that said fiber endface lies within a few hundredths of a millimeter of said front face of said photoreceiver.
(e) injecting optical energy into said optical fiber, the optical energy being converted by said photoreceiver into an electrical signal, and moving said female member orthogonally to said reference axis until said electrical signal reaches a maximum level corresponding to optimal positioning of said female member and said fiber endface, and
(f) securing said face of said female member in the optimal position to said face of said base member.

20. The method claimed in claim 19 wherein said female member face and said base member face are formed as two flanges, and further comprising the step of securing one of said flanges to the other flange by screwing screws freely fitting into smooth holes in one of said flanges and into tapped holes in the other flange, said smooth holes having a greater diameter than that of said tapped holes.

21. A method for positioning a photoemitter with respect to an endface of an optical fiber end wherein
a female member is disposed coaxially with a reference axis and secured to a base member parallel to and below said reference axis,
a male member coaxially houses said optical fiber end and is coupled to said female member to align said fiber end with said reference axis,
the method comprising the steps of
(a) visually positioning a holder bearing said photoemitter over said base member with a micromanipulator such that said photoemitter is substantially coaxial with said reference axis and within a few hundredths of a millimeter of said fiber endface, (b) feeding an electrical signal to terminals of said photoemitter, said electrical signal being converted by said photoemitter into an opticals ignal transmitted through said optical fiber, and moving said holder in three-dimensional space with said micromanipulator until said optical signal derived from said fiber reaches maximum power corresponding to optimal positioning of said photoemitter and said holder, and (c) securing said holder in the optimal position to said base member.

22. A method for positioning an endface of an optical fiber end with respect to a photoemitter comprising (a) visually positioning a holder bearing said photoemitter over a base member with a micromanipulator such that said photoemitter is substantially coaxial with a reference axis and a front face of said photoemitter abuts against a gauge transverse to said reference axis, (b) securing said holder to said base member, and removing said gauge from said reference axis, (c) coupling a female member to a male member in which said said optical fiber end is coaxially housed, (d) moving a face of said female member to a face of said base member so it is orthogonal with said reference axis with said micromanipulator such that said fiber endface lies within a few hundredths of a millimeter of said front face of said photoemitter, (e) feeding an electrical signal to terminals of said photoemitter, said electrical signal being converted by said photoemitter into an optical signal transmitted through said optical fiber, and moving said female member orthogonally to said reference axis until said optical signal derived from said fiber reaches maximum power corresponding to optimal positioning of said female member and said fiber endface, and (f) securing said face of said female member in the optimal position to said face of said base member.

23. The method claimed in claim 22 wherein said female member face and said base member face are formed as two flanges, the method further comprising securing one of said flanges to the other flange by screwing screws freely fitting into smooth holes in one of said flanges into tapped holes holes in the other flange, said smooth holes having a greater diameter than that of said tapped holes.

24. A connector as claimed in claim 8, comprising electronic components connected to said pins and carried by said holder, and an air-tight cap covering said electronic components and fixed to said holder.

* * * * *